United States Patent
Kawamura et al.

(10) Patent No.: US 9,721,727 B2
(45) Date of Patent: Aug. 1, 2017

(54) MULTILAYER CERAMIC CAPACITOR

(71) Applicant: TAIYO YUDEN CO., LTD., Taito-ku, Tokyo (JP)

(72) Inventors: Chie Kawamura, Takasaki (JP); Tetsuo Shimura, Takasaki (JP); Minoru Ryu, Takasaki (JP); Koichiro Morita, Takasaki (JP); Yukihiro Konishi, Takasaki (JP); Yoshiki Iwazaki, Takasaki (JP)

(73) Assignee: TAIYO YUDEN CO., LTD, Tokyo (JP)

(*) Notice: Subject to any disclaimer, the term of this patent is extended or adjusted under 35 U.S.C. 154(b) by 0 days.

(21) Appl. No.: 14/945,388

(22) Filed: Nov. 18, 2015

(65) Prior Publication Data

US 2016/0189865 A1 Jun. 30, 2016

(30) Foreign Application Priority Data

Dec. 26, 2014 (JP) ................. 2014-266258

(51) Int. Cl.
*C04B 35/468* (2006.01)
*H01G 4/12* (2006.01)
(Continued)

(52) U.S. Cl.
CPC ....... *H01G 4/1227* (2013.01); *C04B 35/4682* (2013.01); *H01G 4/012* (2013.01);
(Continued)

(58) Field of Classification Search
CPC .......................... C04B 35/468; C04B 35/4682
(Continued)

(56) References Cited

U.S. PATENT DOCUMENTS 6,043,974 A * 3/2000 Chen .................. C04B 35/4682
361/311
6,078,494 A * 6/2000 Hansen ................ H01G 4/1227
361/321.5
(Continued)

FOREIGN PATENT DOCUMENTS

| JP | 10330160 A | 12/1998 |
| JP | 2001230150 A | 8/2001 |
| JP | 2011256091 A | 12/2011 |

OTHER PUBLICATIONS

Buessem et al. Effects of Grain Growth on the Distribution of Nb in BaTiO3 Ceramics. Journal of the American Ceramic Society, vol. 54, No. 9. Sep. 1971.*

(Continued)

*Primary Examiner* — Noah Wiese
(74) *Attorney, Agent, or Firm* — Law Office of Katsuhiro Arai

(57) ABSTRACT

A multilayer ceramic capacitor has a laminate including dielectric layers laminated alternately with internal electrode layers of different polarities, wherein the dielectric layer contains ceramic grains having Ba, Ti, and X (wherein X represents at least one type of element selected from the group consisting of Mo, Ta, Nb, and W) and a variation in the concentration distribution of X above in the ceramic grain is within ±5%. The multilayer ceramic capacitor can offer excellent service life characteristics even when the thickness of the dielectric layer is 0.8 μm or less, as well as excellent bias characteristics.

9 Claims, 1 Drawing Sheet

(51) Int. Cl.
*H01G 4/30* (2006.01)
*H01G 4/012* (2006.01)

(52) U.S. Cl.
CPC ....... *H01G 4/30* (2013.01); *C04B 2235/3224* (2013.01); *C04B 2235/3239* (2013.01); *C04B 2235/3251* (2013.01); *C04B 2235/3256* (2013.01); *C04B 2235/3258* (2013.01); *C04B 2235/3418* (2013.01); *C04B 2235/5409* (2013.01); *C04B 2235/5445* (2013.01); *C04B 2235/5454* (2013.01); *C04B 2235/6025* (2013.01); *C04B 2235/785* (2013.01); *H01G 4/12* (2013.01)

(58) Field of Classification Search
USPC .......................................................... 501/137
See application file for complete search history.

(56) References Cited

U.S. PATENT DOCUMENTS

| | | | | |
|---|---|---|---|---|
| 2010/0195266 A1* | 8/2010 | Morita | ................... | C04B 35/453 |
| | | | | 361/321.4 |
| 2010/0285947 A1* | 11/2010 | Weir | ...................... | C01B 13/185 |
| | | | | 501/138 |
| 2012/0250216 A1* | 10/2012 | Ishii | ................... | C04B 35/4682 |
| | | | | 361/301.4 |

OTHER PUBLICATIONS

A Notice of Final Rejection issued by Korean Intellectual Property Office, dated Apr. 27, 2017, for Korean counterpart application No. 1020150138453.

* cited by examiner

[Fig. 1]
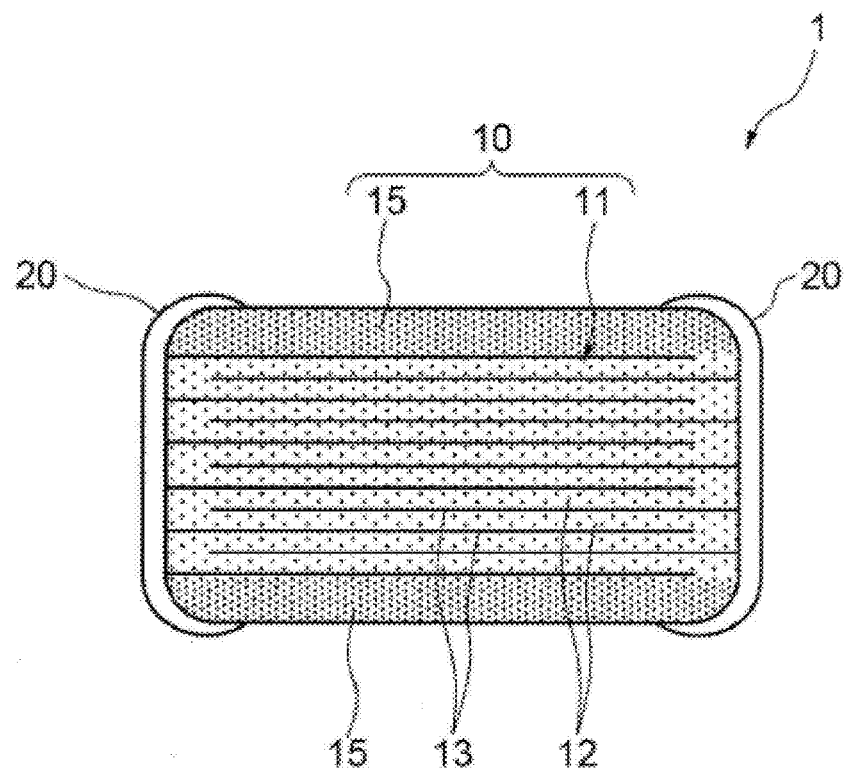
[Fig. 2]
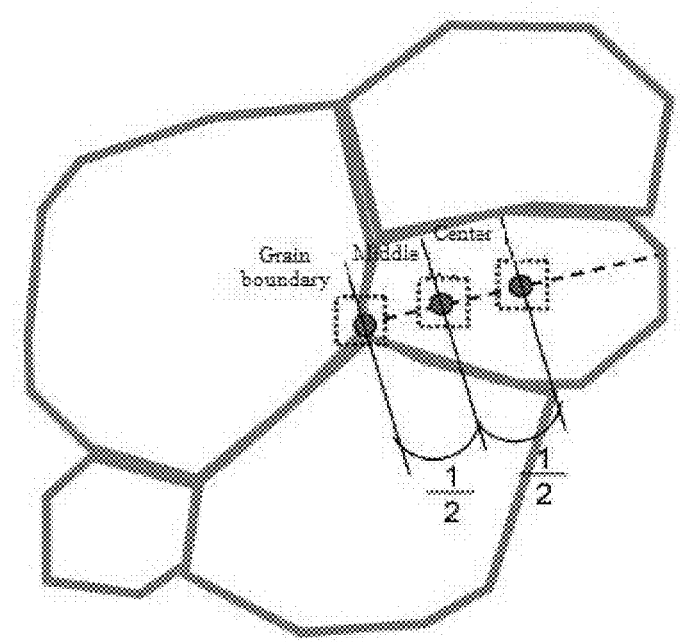

MULTILAYER CERAMIC CAPACITOR

BACKGROUND

Field of the Invention

The present invention relates to a multilayer ceramic capacitor whose ceramic grains that constitute dielectric layers have a roughly uniform concentration distribution of specified donor elements.

In recent years, there is a high demand for smaller electronic components to support higher density electronic circuits used in mobile phones, tablet terminals, and other digital electronic devices, and accordingly multilayer ceramic capacitors (MLCC) that constitute these circuits are rapidly becoming smaller in size and larger in capacitance.

The capacitance of a multilayer ceramic capacitor is directly proportional to the dielectric constant of the constituent material of the dielectric layers constituting the capacitor and also to the number of the dielectric layers, and inversely proportional to the thickness of one dielectric layer. For this reason, answering the demand for smaller multilayer ceramic capacitors requires that the dielectric constant of their material be increased, while the thickness of the dielectric layer be reduced to increase the number of layers.

However, reducing the thickness of the dielectric layer increases the voltage applied per unit thickness, which in turn shortens the service life of the dielectric layer and consequently reduces the reliability of the multilayer ceramic capacitor. Accordingly, dielectric compositions to which such donor elements as Mo and W are added to improve the service life, are proposed.

In addition, the distribution of abundance ratios of the aforementioned donor elements and other additive elements in the ceramic grains constituting the dielectric layer affects the performance of the multilayer ceramic capacitor. About this point, Patent Literature 1, for example, describes a dielectric ceramic offering improved dielectric breakdown voltage, wherein the dielectric ceramic is such that additive elements such as Mn, V, Cr, Co, Ni, Fe, Nb, Mo, Ta, and W are distributed roughly uniformly over the entire range from the grain boundary to the center of the crystal grain. In the example of this literature, barium carbonate, titanium oxide, and oxides of the aforementioned additive elements are mixed together and calcinated at 1200° C., after which other additive element compounds are added and the resulting mixture is calcinated further at 1000° C. in an oxidizing ambience, and thereafter the obtained ceramic material mixture is used to prepare green sheets that are then laminated together and sintered at 1200° C. in a reducing ambience for 2 hours, and then heat-treated at 600° C. in an oxidizing ambience for 30 minutes, to obtain a laminated capacitor. The distribution of additive elements in the dielectric ceramic of the laminated capacitor thus obtained is specified as roughly uniform, as mentioned above, but in reality there was a difference of around seven times between the grain boundary portion and the center portion, according to the literature.

Patent Literature 2 proposes a multilayer ceramic capacitor whose service life will not be shortened due to dielectric breakdown, etc., even if the number of dielectric layers is increased or the thickness of the dielectric layer is reduced, and which also permits size reduction and capacitance increase; wherein the constitution of the multilayer ceramic capacitor is such that its ceramic grain is constituted by a crystalline core and a shell that encloses the core, that additive elements such as Mn, V, Cr, Mo, Fe, Ni, Cu, and Co are added to the core, and that the concentration of these additive elements increases from the center of the core toward the shell. In the example of this literature, barium carbonate, titanium oxide, and compounds of the aforementioned additive elements are mixed together and then calcinated at 200° C. for 2 hours to synthesize barium titanate containing the additive elements, after which other additive elements are added and the resulting mixture is calcinated at 1000° C. for 2 hours to obtain ceramic grains, and thereafter using the obtained ceramic grains ceramic green sheets are prepared and laminated together and then sintered at 1130° C. in a reducing ambience for 3 hours and heated at 600° C. in an oxidizing ambience for 30 minutes, to obtain a multilayer ceramic capacitor. It is indicated that, with the obtained multilayer ceramic capacitor, the concentration of additive elements in the core of the ceramic grain that forms the dielectric layer was around 290 ppm, while the concentration of additive elements in the shell was around 410 ppm.

Also, Patent Literature 3 describes a barium titanate ceramic grain as a dielectric ceramic that will give a multilayer ceramic capacitor offering good capacitance-temperature characteristics and excellent service life characteristics, wherein such grain is characterized in that it has a core and a shell and contains rare earth elements R and M (here, M represents at least one type selected from the group consisting of Mg, Mn, Ni, Co, Fe, Cr, Cu, Al, Mo, W, and V) as secondary constituents, where the total concentration of R and M slopes from the grain boundary to the core and becomes minimal in a portion and maximal in another portion.

DESCRIPTION OF THE RELATED ART

[Patent Literature 1] Japanese Patent Laid-open No. Hei 10-330160
[Patent Literature 2] Japanese Patent Laid-open No. 2001-230150
[Patent Literature 3] Japanese Patent Laid-open No. 2011-256091

SUMMARY

However, the inventions described in these literatures have room for improving the service life characteristics when the thickness of the dielectric layer is 0.8 μm or less. To be specific, a fluctuating distribution of additive elements in the ceramic grain leads to more oxygen defects in low concentration areas, which in turn causes the service life characteristics to drop.

Accordingly, an object of the present invention is to provide a multilayer ceramic capacitor offering excellent service life characteristics even when the thickness of the dielectric layer is 0.8 μm or less, as well as excellent bias characteristics.

Any discussion of problems and solutions involved in the related art has been included in this disclosure solely for the purposes of providing a context for the present invention, and should not be taken as an admission that any or all of the discussion were known at the time the invention was made.

The inventors of the present invention studied in earnest to achieve the aforementioned object and found that, particularly with regard to the donor constituents of Mo, Ta, Nb, and W, a fluctuating concentration distribution in the dielectric ceramic prevents their characteristics from being utilized fully. If a location exists where the donor constituents are less abundant, the amount of oxygen defects increases at that location and consequently the service life cannot be improved sufficiently owing to the donor constituents.

In addition, it was also found that, in areas where these donor constituents are highly concentrated, the bias characteristics drop and as a result the bias characteristics of the multilayer ceramic capacitor as a whole also drop.

While solving the aforementioned problems, the present invention achieves the aforementioned object and provides a multilayer ceramic capacitor having a laminate comprising dielectric layers laminated alternately with internal electrode layers of different polarities, wherein the dielectric layer contains ceramic grains having Ba, Ti, and X (wherein X represents at least one type of element selected from the group consisting of Mo, Ta, Nb, and W) and a variation in the concentration distribution of X above in the ceramic grain is within ±5%.

Preferably the concentration of X in the dielectric layer is 0.05 to 0.3 mol relative to 100 mol of Ti, from the viewpoint of the service life characteristics of the multilayer ceramic capacitor.

In addition, preferably the average grain size of the ceramic grain is 80 to 800 nm from the viewpoint of thickness reduction of the dielectric layer.

Normally the ceramic grain is constituted primarily by barium titanate, in which X, which is an additive element, has been dissolved as a solid solution, etc.

In addition, preferably the dielectric layer contains Mo as X above, from the viewpoint of service life characteristics of the multilayer ceramic capacitor.

According to the present invention, a multilayer ceramic capacitor offering excellent service life characteristics even when the thickness of the dielectric layer is 0.8 μm or less, as well as excellent bias characteristics, is provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1 shows a schematic longitudinal section view of a multilayer ceramic capacitor in an embodiment of the present invention.

FIG. 2 is a schematic view showing three locations in a ceramic grain for measuring the concentration of donor element X (peak intensity ratio of Ba and Ti).

DESCRIPTION OF THE SYMBOLS

1 Multilayer ceramic capacitor
10 Ceramic sintered compact
11 Laminate
12 Dielectric layer
13 Internal electrode layer
15 Cover layer
20 External electrode

DETAILED DESCRIPTION OF EMBODIMENTS

A multilayer ceramic capacitor in an embodiment of the present invention is explained below. FIG. 1 is a schematic longitudinal section view of a multilayer ceramic capacitor 1 according to the present invention.

[Multilayer Ceramic Capacitor]

The multilayer ceramic capacitor 1 roughly comprises a ceramic sintered compact 10 having standard-defined chip dimensions and shape (such as rectangular solid of 1.0×0.5× 0.5 mm) and a pair of external electrodes 20 formed on both sides of the ceramic sintered compact 10. The ceramic sintered compact 10 is primarily constituted by a grain crystal containing Ba and Ti, and has a laminate 11 that internally contains dielectric layers 12 laminated alternately with internal electrode layers 13, as well as cover layers 15 formed as outermost layers at the top and bottom of it in the laminating direction.

The laminate 11 has a high-density multi-layer structure comprising a total of one hundred to several hundred layers, having dielectric layers 12 with a thickness of 0.8 μm or less sandwiched between two internal electrode layers 13, according to the electrostatic capacitance, required withstand voltage, and other specifications.

The cover layers 15 formed in the outermost layer portions of the laminate 11 protect the dielectric layers 12 and internal electrode layers 13 from humidity, contaminants, and other pollutants coming from the outside, thereby preventing them from deteriorating over time.

In addition, the edges of the internal electrode layers 13 are led out alternately to the pair of external electrodes 20 of different polarities present on both ends of the dielectric layer 12 in the length direction.

Additionally, the dielectric layers 12 of the multilayer ceramic capacitor 1 according to the present invention contain ceramic grains having Ba, Ti, and donor element X, where a variation in the concentration distribution of donor element X in the ceramic grains is within ±5%. To be specific, X above represents one type of element selected from the group consisting of Mo, Ta, Nb, and W.

Because the concentration distribution of donor element X is roughly uniform as mentioned above, the effects of X manifest over the whole ceramic grains constituting the dielectric layers 12, thus keeping the amount of oxygen defects from varying while efficiently improving the service life characteristics and bias characteristics (smallness of the rate of change in electrostatic capacitance when DC voltage is applied). Furthermore, this uniform distribution allows the effects to be achieved by adding only a small amount of donor element X, which eliminates locations where donor element X has been added in particularly high concentrations compared to when its concentration is distributed unevenly, which in turn inhibits the dielectric constant and bias characteristics from dropping.

Also, it should be noted that, when a variation in the concentration distribution (hereinafter referred to simply as "the concentration distribution") is within ±5%, it specifically means that, upon observing the ceramic grain with a transmission electron microscope (TEM), the concentration of X falls within a variation range of ±5% at the center portion along the maximum diameter of the ceramic grain, at the grain boundary portion along the adjoining ceramic grains, and at the middle portion between the center portion and grain boundary portion (also refer to FIG. 2).

This is explained more specifically as follows. That is to say, the peak intensity of X (XKα) and peak intensity of Ba and Ti (BaL+TiK) are obtained at the three locations mentioned above by means of TEM-EDS measurement, to calculate the intensity ratio (XKα/(BaL+TiK)). As a result, three intensity ratios are calculated, each of which indicates the relative quantity of X to Ba and Ti at each measurement location. Then, the average (Ave) of the three intensity ratios is obtained to check if the variation (defined by the equation below) of the peak intensity ratio (Pi) at each location from the average (Ave) is within a range of ±5% at all locations.

$$\frac{Pi - Ave}{Ave} \times 100(\%)$$ [Mathematical Equation 1]

When this calculation of peak intensity ratio, average, and variation is performed on randomly selected 10 ceramic grains in a given dielectric layer of a multilayer ceramic capacitor, the variation of the peak intensity ratio from the average is within a range of ±5% at all locations including the center portion, grain boundary portion and middle portion on at least eight grains of the multilayer ceramic capacitor under the present invention. In reality, obtaining the variations of the maximum and minimum intensity ratios from the average is enough to obtain the variation for one ceramic grain.

It should be noted that the above measurement of peak intensity ratio, etc., is performed by producing specified samples from a multilayer ceramic capacitor 1 and then observing the ceramic grains in the samples. The sample production method is explained in detail in "Examples."

From the viewpoints of the service life characteristics and bias characteristics of the multilayer ceramic capacitor 1, the variation of the peak intensity ratio from the average falls within a range of ±5% at all locations including the center portion, grain boundary portion and middle portion of preferably at least nine out of randomly selected 10 ceramic grains, or more preferably all 10 ceramic grains, in a given dielectric layer of the multilayer ceramic capacitor on which the calculation of peak intensity ratio, average, and variation has been performed.

In addition, while the concentration of X in the dielectric layer 12 is not limited in any way so long as the effects under the present invention can manifest, preferably it is 0.05 to 0.3 mol relative to 100 mol of Ti in the dielectric layer 12 from the viewpoints of service life characteristics and bias characteristics of the multilayer ceramic capacitor 1.

In addition, preferably X is Mo from the viewpoints of service life characteristics and bias characteristics of the multilayer ceramic capacitor 1.

The multilayer ceramic capacitor 1 under the present invention is such that its dielectric layers 12 contain new ceramic grains having a uniform concentration distribution of donor element X as explained above.

While the average grain size of these ceramic grains is not limited in any way, preferably it is 80 to 800 nm from the viewpoint of thickness reduction of the dielectric layer 12. It should be noted that, in this Specification, the average grain size refers to the average of Feret diameters measured on all grains observed in multiple photographs showing at least 300 grains (randomly selected) in total, taken with a scanning electron microscope (SEM) or TEM by observing the ceramic grains and then adjusting the magnifications so that around 80 grains (randomly selected) would be seen in one image. The Feret diameter refers to the directed tangential diameter defined by the distance between two parallel tangential lines sandwiching a grain.

[Method for Manufacturing Multilayer Ceramic Capacitor]

The following explains the method for manufacturing the multilayer ceramic capacitor under the present invention as explained above.

First, a material powder for forming dielectric layers is prepared. The dielectric layers contain Ba and Ti, normally in the form of sintered barium titanate grains.

Barium titanate is a tetragonal compound having a perovskite structure, exhibiting a high dielectric constant. This barium titanate is generally obtained by causing titanium dioxide or other titanium material to react with barium carbonate or other barium material, to synthesize barium titanate. It should be noted that preferably the specific surface area of the titanium material is in a range of 10 to 300 $m^2/g$ from the viewpoints of synthesizing fine barium titanate and suppressing the concentration variation of donor element X within the ceramic grain in the dielectric layer, while preferably the specific surface area of the barium material is in a range of 10 to 50 $m^2/g$ from the viewpoints of synthesizing fine barium titanate and suppressing the concentration variation of donor element X within the ceramic grain in the dielectric layer.

Various methods have been heretofore known for synthesizing the barium titanate, such as the solid phase method, sol-gel method, and hydrothermal method, for example. Under the present invention, any of these methods can be adopted.

It should be noted that, under the present invention, one method is used to make the concentration distribution of donor element X roughly uniform within the ceramic grain in the dielectric layer, which is to mix an X-containing compound (such as oxide) with titanium material and barium material and then cause synthetic reaction for barium titanate, thus producing barium titanate grains in which X has been dissolved roughly uniformly as a solid solution.

Specified additive compounds may be added to the obtained ceramic powder according to the purpose. Examples of the additive compounds include MgO, $MnCO_3$, oxides of rare earth elements (Y, Dy, Tm, Ho, and Er), and oxides of Y, Sm, Eu, Gd, Tb, Er, Tm, Cr, V, Mn, Co, Ni, Li, B, Na, K, and Si.

When the above method of dissolving donor element X in barium titanate grains beforehand as a solid solution is adopted, the concentration distribution of X is already within ±5% in the barium titanate grains and therefore the grains need not be grown much during the formation of dielectric layers, unlike when a different method is used as illustrated next. This allows the average grain size of ceramic grains in the dielectric layer to be reduced, which in turn permits further thickness reduction of the dielectric layer.

In a different method, barium titanate is synthesized without adding any X-containing compound; instead, barium titanate grains are manufactured and then an X-containing compound is added, after which the mixture is put through sintering reaction so that the average volume of the ceramic grains in the dielectric layer eventually becomes at least eight times the average volume of the barium titanate grains. By growing the ceramic grains this way to a specified size or larger during the formation of dielectric layers, the concentration distribution of X in the grains falls within ±5%. It should be noted that the aforementioned average volume is roughly obtained as the volume of a sphere based on the average grain size of each grain.

According to this method, preferably the X-containing compound is mixed with the barium titanate grains first and then calcinated at 820 to 1150° C. Next, the obtained barium titanate grains are wet-mixed with the additive compounds (the same specific examples cited above apply), after which the mixture is dried and pulverized to prepare a ceramic powder.

Preferably the specific surface area of the X-containing compound used in the ceramic powder preparation method explained above is 2 to 20 m$^2$/g from the viewpoint of suppressing the concentration variation of donor element X within the ceramic grain in the dielectric layer.

In addition, preferably the average grain size of the barium titanium grains obtained by the method explained above, for example, and used in the manufacture of the multilayer ceramic capacitor under the present invention, is 50 to 150 nm from the viewpoint of reducing the thickness of the dielectric layer. The method for measuring the average grain size adopted here is the same as the method for measuring the average grain size of the ceramic grains.

The ceramic powder obtained as above, for example, may be pulverized to adjust the grain sizes or a classification process may be combined to equalize the grain sizes, as necessary.

Then, polyvinyl butyral (PVB) resin or other binder, ethanol, toluene, or other organic solvent, and dioctyl phthalate (DOP) or other plasticizer are added to and wet-mixed with the ceramic powder. The obtained slurry is coated onto a base material, etc., using the die-coater method or doctor blade method, for example, in the form of a band-shaped dielectric green sheet of 1.2 μm or less in thickness, and then dried. Thereafter, a metal conductive paste containing organic binder is printed onto the surface of the dielectric green sheet by means of screen printing or gravure printing, to dispose internal electrode layer patterns that are led out alternately to a pair of external electrodes of different polarities. For this metal, nickel is widely adopted from the viewpoint of cost. It should be noted that barium titanate with an average grain size of 50 nm or less may be uniformly dispersed in the metal conductive paste as a co-material.

After that, the dielectric green sheet on which the internal electrode layer patterns have been printed is stamped out to specified sizes, and the stamped-out dielectric green sheets are laminated to a specified number of layers (such as 100 to 500 layers) in such a way that the internal electrode layers 13 alternate with the dielectric layers 12 while their base material has been separated, and also that the internal electrode layers are led out alternately to the pair of external electrodes of different polarities, with their edges exposed alternately at both end faces of the dielectric layer in the length direction. Cover sheets that will become cover layers 15 are pressure-bonded to the top and bottom of the laminated dielectric green sheets, after which the laminate is cut to specified chip dimensions (such as 1.0 mm×0.5 mm) and then a Ni conductive paste that will become external electrodes 20 is applied onto both side faces of the cut laminate and dried. This way, a molding of a multilayer ceramic capacitor 1 is obtained. The external electrodes may be formed on both end faces of the laminate by means of thick film deposition using the sputtering method.

The molding of a multilayer ceramic capacitor thus obtained is exposed to a N$_2$ ambience of 250 to 500° C. to remove the binder, and then sintered in a reducing ambience at 1100 to 1300° C. for 10 minutes to 2 hours to sinter the compounds constituting the dielectric green sheet and thereby grow the grains. This way, a multilayer ceramic capacitor 1 is obtained which has a laminate 11 that internally contains, as a sintered compact, the sintered dielectric layers 12 laminated alternately with the internal electrode layers 13, as well as the cover layers 15 formed as outermost layers at the top and bottom of it in the laminating direction.

Under the present invention, re-oxidization treatment may be implemented at 600 to 1000° C.

Additionally, under the present invention, if donor element X is not dissolved beforehand as a solid solution when preparing barium titanate, the temperature and time of sintering reaction are adjusted as deemed necessary so that the average volume of the ceramic grains in the dielectric layer becomes at least eight times the average volume of the barium titanate grains.

There is another embodiment relating to the method for manufacturing multilayer ceramic capacitor, where the external electrodes and dielectrics may be sintered in different processes. For example, a laminate constituted by laminated dielectric layers may be sintered and then a conductive paste may be baked onto both ends of it to form external electrodes.

EXAMPLES

The present invention is explained in greater detail below using examples. It should be noted, however, that the present invention is not at all limited to these examples.

Example 1

Mo was used as donor element X. Hexaammonium heptamolybdate tetrahydrate was dissolved in ion exchange water and, after adding a dispersant, the resulting aqueous solution was made into a slurry with BaCO$_3$ (30 m$^2$/g) and TiO$_2$ (50 m$^2$/g) added to a Ba/Ti mol ratio of 1, and then the slurry was mixed and dispersed using a bead mill.

For this slurry, 0.05 mol of Mo was added in equivalent MoO$_3$ quantity relative to 100 mol of the barium titanate. The slurry was dried to remove the water, and then calcinated at 900° C., to synthesize a Mo-containing barium titanate with an average grain size of 80 nm as obtained from SEM photographs.

Next, additive materials were added at ratios of 0.5 mol for Ho$_2$O$_3$, 0.1 mol for MnCO$_3$, 0.1 mol for V$_2$O$_5$, and 1.0 mol for SiO$_2$, relative to 100 mol of the Mo-containing barium titanate, and BaCO$_3$ or TiO$_2$ was also added so that the Ba/Ti mol ratio (mol ratio of Ba and Ti in the total of barium titanate containing Mo solid solution and BaCO$_3$ or TiO$_2$ that had been added) became 1.000, after which solvent was added to make the mixture into a slurry. A PVB binder was added to the slurry and the mixture was coated onto a PET film to a thickness of 1.0 μm to produce a green sheet.

Next, a Ni conductive paste was printed onto the green sheet as internal electrodes and the printed green sheet was used to produce a 400-layer multilayer ceramic capacitor of 1005 shape (1.0 mm×0.5 mm). After removing the binder, the multilayer ceramic capacitor was sintered for 0.5 hour in a reducing ambience at 1200° C. and then re-oxidized in a N$_2$ ambience at 800° C. After the sintering process, the thickness of the dielectric layer was 0.8 μm, thickness of the internal electrode layer was 0.9 μm, and capacitance of the multilayer ceramic capacitor was approx. 10 μF.

Also, when the Mo quantity contained in the dielectric layer of the multilayer ceramic capacitor was measured by ICP, the MoO$_3$-equivalent Mo quantity was 0.05 mol relative to 100 mol of the barium titanate.

In addition, the concentration distribution of Mo in each area of the dielectric ceramic was measured by TEM-EDS (TEM JEM-2100F manufactured by JEOL and EDS detector JED-2300T manufactured by JEOL). The observation samples were produced by mechanically polishing the re-oxidized multilayer ceramic capacitor (plane-polished perpendicularly to the internal electrode layer) and then ion-milling it into thinly sliced samples of 0.05 μm in thickness.

As for the range of EDS measurement, an area of 20 nm×20 nm was measured in three locations in the dielectric ceramic portion sandwiched by the Ni internal electrode layers, including the center portion along the maximum diameter of the ceramic grain, grain boundary portion with the adjoining ceramic grain (including the interface with the adjoining grain), and middle portion between the center portion and grain boundary portion, as shown in the schematic view in FIG. 2.

The intensity ratio MoKα/(TiKα+BaLα) was obtained from the MoKα peak area near 17.5 keV and the TiKα+BaLα peak area at 4.5 keV by means of EDS. This was done at each of the three locations on 10 ceramic grains. One of the obtained intensity ratio (area) results is shown below:

Grain boundary portion=$0.67 \times 10^{-4}$

Middle portion=$0.67 \times 10^{-4}$

Center portion=$0.68 \times 10^{-4}$

The intensity ratio was measured as mentioned above at each of the three locations in 10 ceramic grains, and based on the average (Ave) of three intensity ratios obtained for each grain, whether or not the variation (defined by the equation below) of the peak intensity ratio (Pi) at each location from the average (Ave) was within a range of ±5% at all locations was examined. The results are shown in Table 1 below. In Table 1 below, the maximum value of variation obtained is shown in the "Variation in Mo concentration" column. Also, while the average and variation in Mo concentration are rounded values, the unrounded average was used to calculate the variation in Mo concentration.

$$\frac{Pi - Ave}{Ave} \times 100 (\%) \quad \text{[Mathematical Equation 2]}$$

TABLE 1

Measured Results in Example 1

Intensity ratio MoKα/(BaLα + TiKα) × $10^{-4}$

| Grain No. | Grain center | Middle | Grain boundary | Average | Variation in Mo concentration |
|---|---|---|---|---|---|
| 1 | 0.67 | 0.67 | 0.68 | 0.67 | 1.0% |
| 2 | 0.67 | 0.68 | 0.68 | 0.68 | −1.0% |
| 3 | 0.66 | 0.67 | 0.68 | 0.67 | −1.5% |
| 4 | 0.67 | 0.68 | 0.68 | 0.68 | −1.0% |
| 5 | 0.66 | 0.67 | 0.67 | 0.67 | −1.0% |
| 6 | 0.67 | 0.67 | 0.67 | 0.67 | 0.0% |
| 7 | 0.65 | 0.68 | 0.68 | 0.67 | −3.0% |
| 8 | 0.67 | 0.68 | 0.68 | 0.68 | −1.0% |
| 9 | 0.68 | 0.68 | 0.68 | 0.68 | 0.0% |
| 10 | 0.66 | 0.67 | 0.69 | 0.67 | 2.5% |

As shown in Table 1, the variation of the peak intensity ratio from the average was roughly the same for the 10 grains and within ±5% in all cases. The Mo concentration distribution fell within ±5% at the grain center portion, grain boundary portion, and middle portion in between in the dielectric ceramic, presumably because the Mo compound, $BaCO_3$, and $TiO_2$ were mixed and reacted together beforehand.

Also, the average grain size of the ceramic grains in the dielectric layer, as obtained by TEM observation, was 150 nm.

Next, when the high-temperature accelerated service life (time until the insulation resistivity (ρ) becomes 1×10$^{10}$ Ωcm at 125° C. in a direct-current electric field of 10 V/μm) of the produced multilayer ceramic capacitor was measured, it was 36000 seconds. Also, the DC bias characteristics (rate of capacitance reduction at 3 V/μm relative to the capacitance at 0 bias) at 25° C., 1 kHz was 50%.

Table 2 below shows a list of measured results (average grain size of material barium titanate (including X-containing barium titanate), type and quantity of constituent X, average grain size of ceramic grains in dielectric layer, thickness of dielectric layer, number of grains whose concentration variation of constituent X is within ±5%, high-temperature accelerated service life test result, DC-bias characteristics) including the results of Examples 2 to 10 and Comparative Examples 1 and 2 as explained below.

Example 2

A multilayer ceramic capacitor was produced in the same manner as in Example 1, except that $MoO_3$ with a specific surface area of 5 m$^2$/g was used as the Mo material and 0.2 mol of Mo was added in equivalent $MoO_3$ quantity.

When the peak intensity ratio was measured at each of the three locations on 10 ceramic grains in the dielectric layer, the variation of the Mo concentration from the average was within ±5% with all grains. Also, the result of high-temperature accelerated service life test was 62100 seconds and the rate of capacitance reduction due to DC bias was 50%.

Example 3

A multilayer ceramic capacitor was produced in the same manner as in Example 1, except that 0.3 mol of Mo was added in equivalent $MoO_3$ quantity.

When the peak intensity ratio was measured at each of the three locations on 10 ceramic grains in the dielectric layer, the variation of the Mo concentration from the average was within ±5% with all 10 grains. Also, the result of high-temperature accelerated service life test was 65000 seconds and the rate of capacitance reduction due to DC bias was 50%.

Example 4

A multilayer ceramic capacitor was produced in the same manner as in Example 1, except that 0.2 mol of Mo was added in equivalent $MoO_3$ quantity, Mo-containing barium titanate grains with an average grain size of 150 nm were synthesized at 950° C., ceramic capacitor sintering temperature was set to 1300° C., and average grain size of dielectric ceramic grains was adjusted to 800 nm.

When the peak intensity ratio was measured at each of the three locations on 10 ceramic grains in the dielectric layer, the variation of the Mo concentration from the average was within ±5% with all 10 grains. Also, the result of high-temperature accelerated service life test was 61600 seconds and the rate of capacitance reduction due to DC bias was 65%. The DC bias became 65%, probably because the average grain size of ceramic grains was large at 800 nm.

Example 5

A multilayer ceramic capacitor was produced in the same manner as in Example 1, except that 0.2 mol of Mo was added in equivalent $MoO_3$ quantity, thickness of the sintered dielectric layer was adjusted to 0.5 µm, and number of layers was set to 250 layers.

When the peak intensity ratio was measured at each of the three locations on 10 ceramic grains in the dielectric layer, the variation of the Mo concentration from the average was within ±5% with all 10 grains. Also, the result of high-temperature accelerated service life test was 42000 seconds and the rate of capacitance reduction due to DC bias was 50%.

Example 6

An aqueous solution in which a dispersant had been added was made into a slurry by adding $BaCO_3$ (specific surface area 50 $m^2/g$) and $TiO_2$ (300 $m^2/g$) to a Ba/Ti mol ratio of 1, and then mixed and dispersed using a bead mill. The slurry was dried to remove the water, and then calcinated at 890° C. to synthesize a barium titanate with an average grain size of 50 nm as obtained from SEM photographs.

Using this barium titanate and adding $MoO_3$ at a ratio of $MoO_3$=0.2 mol relative to 100 mol of the barium titanate, the mixture was heat-treated at 895° C. to grow the grains to an average grain size of 80 nm. Additive materials were added at ratios of 0.5 mol for $Ho_2O_3$, 0.1 mol for $MnCO_3$, 0.1 mol for $V_2O_5$, and 1.0 mol for $SiO_2$, relative to 100 mol of the barium titanate, and $BaCO_3$ or $TiO_2$ was also added so that the Ba/Ti mol ratio (mol ratio of Ba and Ti in the total of barium titanate containing Mo solid solution and $BaCO_3$ or $TiO_2$ that had been added) became 1.000, after which solvent was added to make the mixture into a slurry, and thereafter the same method used in Example 1 was followed to produce a multilayer ceramic capacitor.

It should be noted that, because the sintering temperature was set to 1230° C., the average grain size of the dielectric ceramic grains was 160 nm. There were eight grains whose variation of the Mo concentration from the average was within ±5%. The Mo quantity in each area inside the dielectric ceramic grain became uniform because barium titanate grains sufficiently smaller than the dielectric ceramic grains (average volume of dielectric ceramic grains/average volume of material barium titanate grains=8 times or more) were used.

Also, the result of high-temperature accelerated service life test was 62100 seconds and the rate of capacitance reduction due to DC bias was 55%.

Examples 7, 8, 9 and 10

A multilayer ceramic capacitor was produced in the same manner as in Example 1, except that Ta, Nb, W, or Mo+Ta were used as constituent X and 0.2 mol of X was added relative to 100 mol of the barium titanate. For the material of constituent X, an oxide with a specific surface area of 5 $m^2/g$ or more was used.

When the peak intensity ratio was measured at each of the three locations on 10 ceramic grains in the dielectric layer, the variation of the constituent X concentration from the average was within ±5% with all grains in Examples 7, 8 and 9, while the variation of the constituent X concentration from the average was within ±5% with nine grains in Example 10. Also, the result of high-temperature accelerated service life test and bias characteristics were good, as shown in Table 2.

Comparative Example 1

A multilayer ceramic capacitor was produced in the same manner as in Example 1, except that Mo was not added.

The result of high-temperature accelerated service life test was 1500 seconds and the rate of capacitance reduction due to DC bias was 50%. Since Mo was not added, the bias characteristics were relatively good, but the service life turned out to be short.

Comparative Example 2

Using a barium titanate with an average grain size of 80 nm, additive materials were added at ratios of 0.2 mol for $MoO_3$, 0.5 mol for $Ho_2O_3$, 0.1 mol for $MnCO_3$, 0.1 mol for $V_2O_5$, and 1.0 mol for $SiO_2$, relative to 100 mol of the barium titanate, and $BaCO_3$ or $TiO_2$ was also added so that the Ba/Ti mol ratio (mol ratio of Ba and Ti in the total of barium titanate containing Mo solid solution and $BaCO_3$ or $TiO_2$ that had been added) became 1.000, after which solvent was added to make the mixture into a slurry, and thereafter the same method used in Example 1 was followed to produce a multilayer ceramic capacitor.

The average grain size of the ceramic grains in the dielectric layer was 150 nm, and the variation of the Mo concentration from the average was within ±5% with none of the grains. Since the average volume of the dielectric ceramic grains was around seven times the volume of the barium titanate grains used as material, the Mo quantity in each area inside the dielectric ceramic grain did not become uniform.

Also, the result of high-temperature accelerated service life test was 12000 seconds, and although this represents a longer service life compared to when Mo was not added, the Mo abundance was not uniform in each area and therefore the service life turned out to be shorter than in the Examples, while the rate of capacitance reduction due to DC bias also deteriorated to 72%.

The above results are summarized in Table 2 below.

TABLE 2

| Example | Starting barium titanate grain (nm) | Constituent X | Content of constituent X in ceramic capacitor | Dielectric ceramic grain size (nm) | Layer thickness µm | Grains whose variation in constituent X concentration is within ±5% (number of grains) | Average service life (sec) | DC bias characteristics Rate of capacitance reduction (%) |
|---|---|---|---|---|---|---|---|---|
| Example 1 | 80 | Mo | 0.05 | 150 | 0.8 | 10 | 36000 | 50 |
| Example 2 | 80 | Mo | 0.2 | 150 | 0.8 | 10 | 62100 | 50 |
| Example 3 | 80 | Mo | 0.3 | 150 | 0.8 | 10 | 65000 | 50 |
| Example 4 | 150 | Mo | 0.2 | 800 | 0.8 | 10 | 61600 | 65 |

TABLE 2-continued

| Example | Starting barium titanate grain (nm) | Constituent X | Content of constituent X in ceramic capacitor | Dielectric ceramic grain size (nm) | Layer thickness μm | Grains whose variation in constituent X concentration is within ±5% (number of grains) | Average service life (sec) | DC bias characteristics Rate of capacitance reduction (%) |
|---|---|---|---|---|---|---|---|---|
| Example 5 | 80 | Mo | 0.2 | 150 | 0.5 | 10 | 42000 | 50 |
| Example 6 | 50→80 | Mo | 0.2 | 160 | 0.8 | 8 | 62100 | 55 |
| Example 7 | 80 | Ta | 0.2 | 150 | 0.8 | 10 | 40000 | 50 |
| Example 8 | 80 | Nb | 0.2 | 150 | 0.8 | 10 | 40000 | 50 |
| Example 9 | 80 | W | 0.2 | 150 | 0.8 | 10 | 50000 | 50 |
| Example 10 | 80 | Mo + Ta | 0.1 + 0.1 | 150 | 0.8 | 9 | 50200 | 50 |
| Comparative Example 1 | 80 | None | 0 | 150 | 0.8 | None | 1500 | 50 |
| Comparative Example 2 | 80 | Mo | 0.2 | 150 | 0.8 | 0 | 12000 | 72 |

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2014-266258, filed Dec. 26, 2014, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A multilayer ceramic capacitor having a laminate comprising dielectric layers laminated alternately with internal electrode layers of different polarities, wherein the dielectric layer comprises sintered ceramic grains each containing Ba, Ti, and X (wherein X represents at least one element selected from the group consisting of Mo, Ta, Nb, and W) and a variation (V) in concentration distribution of X at each measuring point in the sintered ceramic grain is defined by the following equation and each of $V_{(1)}$, $V_{(2)}$, and $V_{(3)}$ is within ±5(%):

$$V_{(m)} = \frac{Pi_{(m)} - Ave}{Ave} \times 100(\%)$$

wherein m is 1, 2, or 3; $Pi_{(m)}$ is a concentration of X measured respectively at a center portion (m=1), at a grain boundary portion (m=2) with adjoining sintered ceramic grain(s), and at a middle portion (m=3) between the center portion and the grain boundary portion of the sintered ceramic grain defined along a maximum diameter of the sintered ceramic grain, and Ave is an average concentration of X at the above three portions (m=1, 2, and 3) of the sintered ceramic grain, wherein an average grain size of the sintered ceramic grains is 80 to 800 nm.

2. A multilayer ceramic capacitor according to claim 1, wherein a concentration of X in the dielectric layer is 0.05 to 0.3 mol relative to 100 mol of Ti.

3. A multilayer ceramic capacitor according to claim 1, wherein the ceramic grain is constituted primarily by barium titanate.

4. A multilayer ceramic capacitor according to claim 2, wherein the ceramic grain is constituted primarily by barium titanate.

5. A multilayer ceramic capacitor according to claim 1, wherein the dielectric layer contains Mo as X above.

6. A multilayer ceramic capacitor according to claim 2, wherein the dielectric layer contains Mo as X above.

7. A multilayer ceramic capacitor according to claim 3, wherein the dielectric layer contains Mo as X above.

8. A multilayer ceramic capacitor according to claim 4, wherein the dielectric layer contains Mo as X above.

9. A multilayer ceramic capacitor according to claim 1, wherein the dielectric layer has a thickness of 0.8 μm or less.

* * * * *